US012453926B2

(12) United States Patent
Liu

(10) Patent No.: US 12,453,926 B2
(45) Date of Patent: Oct. 28, 2025

(54) DISTANCE-BASED GAMING VIRTUAL PROP OBTAINING METHOD AND APPARATUS, STORAGE MEDIUM, AND ELECTRONIC DEVICE

(71) Applicant: Tencent Technology (Shenzhen) Company Limited, Shenzhen (CN)

(72) Inventor: Zhihong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 545 days.

(21) Appl. No.: 17/516,521

(22) Filed: Nov. 1, 2021

(65) Prior Publication Data

US 2022/0047948 A1 Feb. 17, 2022

Related U.S. Application Data

(63) Continuation of application No. PCT/CN2020/122170, filed on Oct. 20, 2020.

(30) Foreign Application Priority Data

Dec. 31, 2019 (CN) ......................... 201911420007.8

(51) Int. Cl.
*A63F 13/00* (2014.01)
*A63F 13/56* (2014.01)
*A63F 13/837* (2014.01)

(52) U.S. Cl.
CPC ............ *A63F 13/56* (2014.09); *A63F 13/837* (2014.09)

(58) Field of Classification Search
CPC ........ A63F 13/533; A63F 13/69; A63F 13/79; A63F 13/58; A63F 13/355; A63F 13/837;
(Continued)

(56) References Cited

U.S. PATENT DOCUMENTS 7,011,582 B1 * 3/2006 Yamamoto ............ A63F 13/837 463/2
2007/0167203 A1 * 7/2007 Yamada .................. A63F 13/45 463/7

(Continued)

FOREIGN PATENT DOCUMENTS

CN 108525300 A 9/2018
CN 108671540 A 10/2018

(Continued)

OTHER PUBLICATIONS

"Borderlands Ammunition", Feb. 23, 2015, Borderlands wiki, <https://borderlands.fandom.com/wiki/Ammunition?oldid=380482> (Year: 2015).*

(Continued)

*Primary Examiner* — Justin L Myhr
(74) *Attorney, Agent, or Firm* — Morgan, Lewis & Bockius LLP

(57) ABSTRACT

This application discloses a virtual prop obtaining method performed by an electronic device. The method includes: obtaining a shooting result of a shooting battle between first and second virtual characters during running of a shooting task, the first virtual character being controlled by a user of the electronic device and the second virtual character being a non-manipulative character in a target area of the shooting battle; displaying a virtual prop at an area matching a position of the second virtual character in the target area when the first virtual character shot the second virtual character to death; and adding the virtual prop to a prop storage space corresponding to the first virtual character when a distance between the first virtual character and the virtual prop is less than a first distance.

17 Claims, 7 Drawing Sheets

(58) Field of Classification Search
CPC ........ A63F 13/56; A63F 13/573; A63F 13/77; A63F 2300/575
See application file for complete search history.

(56) References Cited

U.S. PATENT DOCUMENTS

| | | | | |
|---|---|---|---|---|
| 2012/0295707 | A1* | 11/2012 | Nonaka | A63F 13/22 463/31 |
| 2013/0244740 | A1 | 9/2013 | Shimamura et al. | |
| 2016/0129345 | A1* | 5/2016 | Seok | A63F 13/213 463/31 |
| 2017/0151502 | A1* | 6/2017 | Yasuda | A63F 13/335 |
| 2017/0161909 | A1* | 6/2017 | Hamanaka | A63F 13/25 |
| 2019/0287339 | A1* | 9/2019 | Oberberger | G07F 17/3244 |
| 2019/0378369 | A1* | 12/2019 | Washington | G07F 17/3246 |
| 2020/0139239 | A1* | 5/2020 | Lee | A63F 13/69 |
| 2020/0197807 | A1* | 6/2020 | Tieger | A63F 13/5258 |
| 2020/0330866 | A1 | 10/2020 | Yang | |
| 2021/0213361 | A1* | 7/2021 | Abecassis | A63F 13/795 |

FOREIGN PATENT DOCUMENTS

| | | | |
|---|---|---|---|
| CN | 109126129 | A | 1/2019 |
| CN | 109925713 | A | 6/2019 |
| CN | 109999499 | A | 7/2019 |
| CN | 110170168 | A | 8/2019 |
| CN | 110368688 | A | 10/2019 |
| CN | 111167124 | A | 5/2020 |
| JP | 2000037561 | A | 2/2000 |
| JP | 2004313252 | A | 11/2004 |
| JP | 2008253521 | A | 10/2008 |
| JP | 2009233098 | A | 10/2009 |
| JP | 2010142479 | A | 7/2010 |
| JP | 2012010881 | A | 1/2012 |
| JP | 2013188335 | A | 9/2013 |
| JP | 2016059605 | A | 4/2016 |
| JP | 2017093978 | A | 6/2017 |
| JP | 2019216836 | A | 12/2019 |
| WO | WO 02060548 | A2 | 8/2002 |

OTHER PUBLICATIONS

IGN, “Mario Kart 8 Guide: Items”, Jun. 1, 2018,<https://www.ign.com/wikis/mario-kart-8/Items> (Year: 2018).*
Tencent Technology, Korean Office Action, KR Patent Application No. 1020227005389, Mar. 5, 2024, 23 pgs.
YouTube.com, “PUBG Bullet Tips” Warcoder, https://www.youtube.com/watch?v=MkXyXwzUMzc, May 2018, 2 pgs.
Tencent Technology, WO, PCT/CN2020/122170, Jan. 18, 2021, 5 pgs.
Tencent Technology, IPRP, PCT/CN2020/122170, Jul. 5, 2022, 6 pgs.
Tencent Technology, Singapore Office Action, SG Patent Application No. 11202201940R, Nov. 1, 2023, 6 pgs.
Tencent Technology, ISR, PCT/CN2020/122170, Jan. 19, 2021, 3 pgs.

* cited by examiner

DISTANCE-BASED GAMING VIRTUAL PROP OBTAINING METHOD AND APPARATUS, STORAGE MEDIUM, AND ELECTRONIC DEVICE

CROSS-REFERENCE TO RELATED APPLICATIONS

This application is a continuation application of PCT Patent Application No. PCT/CN2020/122170, entitled "VIRTUAL PROP OBTAINING METHOD AND DEVICE, STORAGE MEDIUM, AND ELECTRONIC DEVICE" filed on Oct. 20, 2020, which claims priority to Chinese Patent Application No. 201911420007.8, filed with the State Intellectual Property Office of the People's Republic of China on Dec. 31, 2019, and entitled "VIRTUAL PROP OBTAINING METHOD AND APPARATUS, STORAGE MEDIUM, AND ELECTRONIC DEVICE", all of which are incorporated herein by reference in their entirety.

FIELD OF THE TECHNOLOGY

This application relates to the field of computers, and in particular, to a virtual prop obtaining method and apparatus, a storage medium, and an electronic device.

BACKGROUND OF THE DISCLOSURE

At present, in a mobile shooting game application, the way for players to obtain weapons usually depends on the random generation of the system. For example, the system may randomly select some places in a map to generate weapons, and players can obtain weapons when arriving at these places.

In practice, it is found that because of the great uncertainty of the location where weapons are generated, it is difficult for players to predict where to get the weapons, so that the players need to traverse various places on the map to get the weapons. It can be seen that the current way of obtaining weapons in shooting games has the problem of high operation complexity.

For the foregoing problem, no effective solution has been provided yet.

SUMMARY

Embodiments of this application provide a virtual prop obtaining method and apparatus, a storage medium, and an electronic device.

Provided is a virtual prop obtaining method performed by an electronic device, and the method including: obtaining a shooting result of a shooting battle between a first virtual character and a second virtual character during running of a shooting task, the first virtual character being controlled by a user of the electronic device and the second virtual character being a non-manipulative character in a target area of the shooting battle; displaying a virtual prop at an area matching a position of the second virtual character when the shooting result is that the first virtual character shot the second virtual character to death; and adding the virtual prop to a prop storage space corresponding to the first virtual character when a distance between the first virtual character and the virtual prop is less than a first distance.

Provided is a non-transitory computer-readable storage medium, storing computer programs, where the computer programs, when being executed by a processor of an electronic device, cause the electronic device to perform the aforementioned virtual prop obtaining method.

Provided is an electronic device, including a memory, a processor, and computer programs stored on the memory and capable of being executed by the processor, where the computer programs, when being executed by the processor, cause the electronic device to perform the aforementioned virtual prop obtaining method.

Details of one or more embodiments of this application are provided in the subsequent accompanying drawings and descriptions. Other features and advantages of this application become obvious with reference to the specification, the accompanying drawings, and the claims.

BRIEF DESCRIPTION OF THE DRAWINGS

The accompanying drawings described herein are used for providing a further understanding of this application, and form part of this application. Exemplary embodiments of this application and descriptions thereof are used for explaining this application, and do not constitute any inappropriate limitation to this application. In the accompanying drawings.

DESCRIPTION OF EMBODIMENTS

In order to make a person skilled in the art better understand the solutions of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts shall fall within the protection scope of this application.

In this specification, the claims, and the accompanying drawings of this application, the terms "first", "second", and so on are intended to distinguish similar objects but do not necessarily indicate a specific order or sequence. It is to be understood that such used data is interchangeable where appropriate so that the embodiments of this application described here can be implemented in an order other than those illustrated or described here. Moreover, the terms "include" and "contain" and any other variants thereof mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Figure 1:
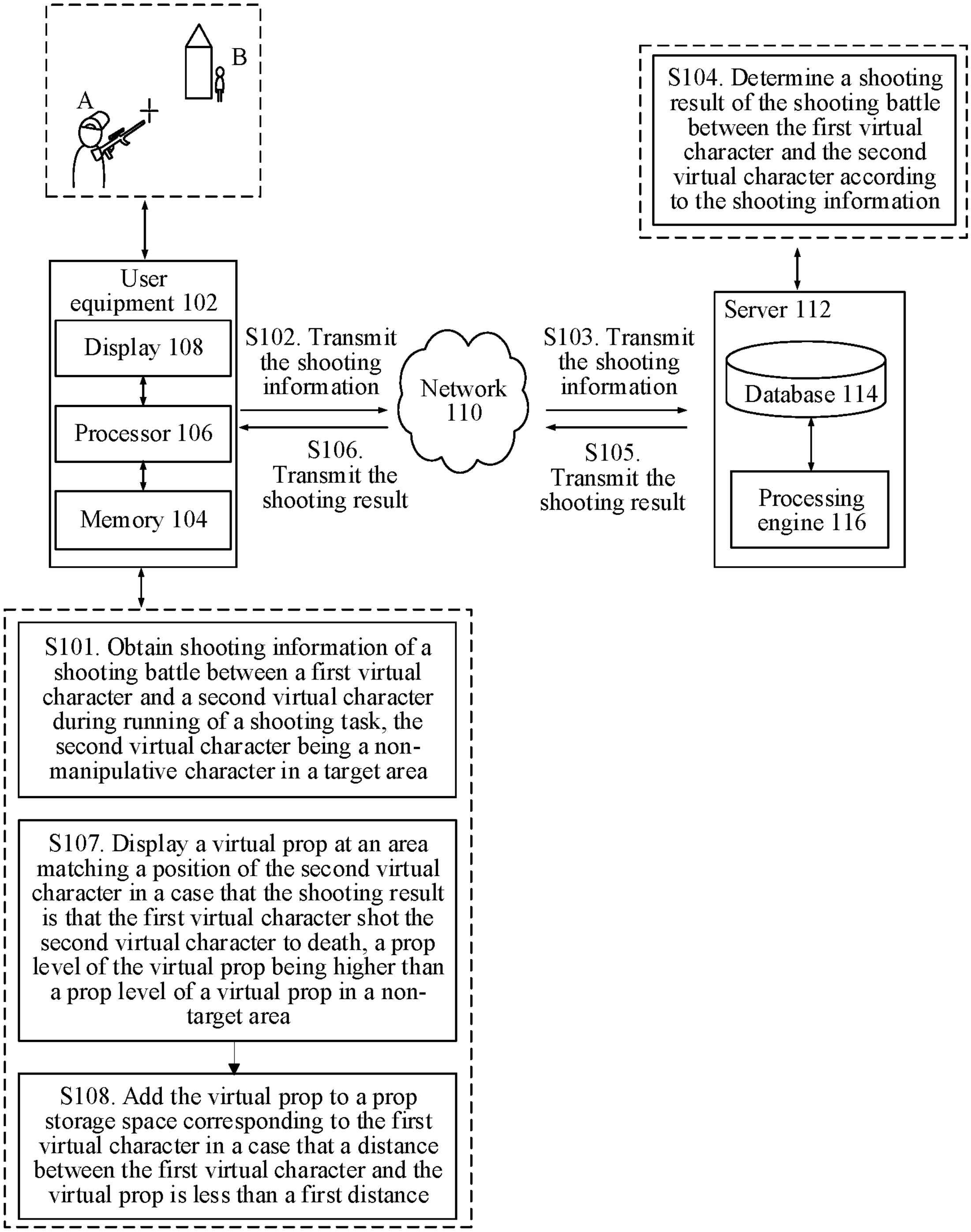
FIG. 1 is a schematic diagram of a network environment of an exemplary virtual prop obtaining method according to an embodiment of this application.

An aspect of the embodiments of this application provides a virtual prop obtaining method. In some embodiments, the virtual prop obtaining method may be, but is not limited to, applied to a virtual prop obtaining system in a network environment shown in FIG. 1. The virtual prop obtaining system includes user equipment 102, a network 110, and a server 112. It is assumed that a client of a game application (as shown in FIG. 1, a shooting game application client) is installed in the user equipment 102, where the user equipment 102 includes a man-machine interaction screen 104, a processor 106, and a memory 108. The man-machine interaction screen 104 is configured to detect a man-machine interactive operation (such as a touch operation or a press operation) through a man-machine interaction interface corresponding to the client. The processor 106 is configured to generate a corresponding operation instruction according to the man-machine interactive operation, and generate, in response to the operation instruction, for example, in response to the touch operation, a corresponding shooting instruction, to control the virtual character to execute a shooting operation in response to the shooting instruction. The memory 108 is configured to store the operation instruction. Further, reference may be made to step S101 to step S108.

S101. The user equipment 102 obtains shooting information of a shooting battle between a first virtual character and a second virtual character during running of a shooting task, the first virtual character being controlled by a user of the electronic device and the second virtual character being a non-manipulative character in a target area of the shooting battle.

In this embodiment of this application, the non-manipulative character refers to a character that is not controlled by a player, and the behavior of the non-manipulative character is controlled by a game program.

S102. The user equipment 102 transmits the shooting information to the network 110.

S103. The network 110 transmits the shooting information to the server 112.

S104. The server 112 determines a shooting result of the shooting battle between the first virtual character and the second virtual character according to the shooting information.

S105. The server 112 transmits the shooting result to the network 110.

S106. The network 110 transmits the shooting result to the user equipment 102.

S107. The user equipment 102 displays a virtual prop at an area matching a position of the second virtual character when the shooting result is that the first virtual character shot the second virtual character to death, a prop level of the virtual prop being higher than a prop level of a virtual prop in a non-target area.

S108. The user equipment 102 adds the virtual prop to a prop storage space corresponding to the first virtual character when a distance between the first virtual character and the virtual prop is less than a first distance.

In this embodiment of this application, the man-machine interaction screen 102 displays a man-machine interaction interface, through which a user can perform man-machine interaction through a touch operation on the man-machine interaction interface. A touch operation by a user can be received through the man-machine interaction screen 102. For example, the user may tap a moving button in the man-machine interaction interface, to control the first virtual character to move, or, the user may alternatively tap a shooting button in the man-machine interaction interface, to control the first virtual character to perform shooting. In addition, during running of a shooting task, the man-machine interaction interface may further display a second virtual character in the shooting battle with the first virtual character. The second virtual character may be a non-manipulative character and can wage an attack against the first virtual character. A player who controls the first virtual character may control the first virtual character to shoot the second virtual character by tapping the shooting button on the man-machine interaction interface. Further, the processor 106 may obtain battle information of the shooting battle between the first virtual character and the second virtual character. The battle information may include, but is not limited to, categories and corresponding times of attacks by the first virtual character to the second virtual character, categories and corresponding times of attacks by the second virtual character to the first virtual character, life values of the first virtual character and the life values of the second virtual character. The processor 106 transmits the battle information to the server 112 through the network 110. The server 112 includes a database 114 and a processing engine 116. The database 114 may be configured to store each attack category and a corresponding attack value or the like, and this is not limited in the embodiments of this application. The processing engine 116 determines a shooting result of the shooting battle between the first virtual character and the second virtual character according to the shooting information. Further, the processing engine 116 determining the shooting result of the shooting battle between the first virtual character and the second virtual character may include: determining an attack value corresponding to each attack category in which the first virtual character attacks the second virtual character; and multiplying each attack value by the attack times corresponding to the attack category to obtain a sum of all the products, and determining the sum of the products as a total number of attacks from the first virtual character to the second virtual character. Similarly, the total number of attacks from the second virtual character to the first virtual character can be obtained. If the total number of attacks from the first virtual character to the second virtual character is greater than the life value of the second virtual character, it is determined that the shooting result is that the first virtual character shot the second virtual character to death. If the total number of attacks from the second virtual character to the first virtual character is greater than the life value of the first virtual character, it is determined that the shooting result is that the second virtual character shot the first virtual character. Further, the server 112 may transmit the shooting result to the user equipment 102 through the network 110, and the user equipment 102 displays a virtual prop at an area matching a position of the second virtual character when the shooting result is that the first virtual character shot the second virtual character to death, a prop level of the virtual prop being higher than a prop level of a virtual prop in a non-target area. Further, the user equipment 102 may obtain a location of the first virtual character and a location of the virtual prop, and add the virtual prop to a prop storage space corresponding to the first virtual character when a distance between the first virtual character and the virtual prop is less than a first distance.

In this embodiment of this application, a shooting result of a shooting battle between a first virtual character and a second virtual character is obtained during running of a shooting task, the first virtual character being controlled by a user of the electronic device and the second virtual character being a non-manipulative character in a target area of the shooting battle; a virtual prop is displayed at an area matching a position of the second virtual character when the shooting result is that the first virtual character shot the second virtual character to death, a prop level of the virtual prop being higher than a prop level of a virtual prop in the non-target area; and the virtual prop is added to a prop storage space corresponding to the first virtual character when a distance between the first virtual character and the virtual prop is less than a first distance. In this process, the virtual prop can be obtained by shooting the second virtual character in the target area, and the virtual prop can be obtained only by shooting the second virtual character in the determined target area without traversing the map to find a randomly generated virtual prop, thereby reducing the operation complexity of obtaining a virtual prop.

The method steps may, but are not limited to, be applied to the virtual prop obtaining system shown in FIG. 1, completed by data exchange between the user equipment 102 and the server 112, or may, but are not limited to, be applied to the user equipment 102 shown in FIG. 1, completed independently by the user equipment 102. The above is only an example and is not limited in this embodiment.

In some embodiments, the user equipment may be, but is not limited to, computer device supporting the operation of an application client such as a mobile phone, a tablet computer, a notebook computer, or a PC. The server and the user equipment may, but are not limited to, enable data exchange via a network, which may include, but is not limited to, a wireless network or a wired network. The wireless network includes: Bluetooth, Wi-Fi, and other networks for implementing wireless communication. The wired network may include, but is not limited to, a wide area network, a metropolitan area network, and a local area network. The above is only an example and is not limited in this embodiment.

Figure 2:
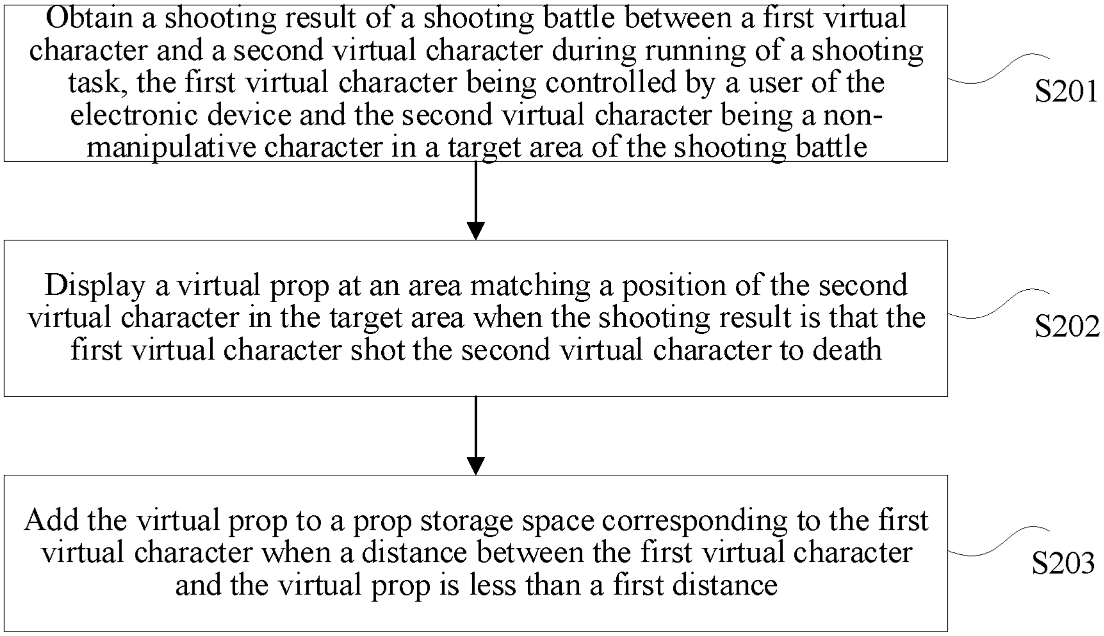
FIG. 2 is a flowchart of an exemplary virtual prop obtaining method according to an embodiment of this application.

In some embodiments, as shown in FIG. 2, the operation control method includes:

S201. Obtain a shooting result of a shooting battle between a first virtual character and a second virtual character during running of a shooting task, the first virtual character being controlled by a user of the electronic device and the second virtual character being a non-manipulative character in a target area of the shooting battle.

S202. Display a virtual prop at an area matching a position of the second virtual character in the target area when the shooting result is that the first virtual character shot the second virtual character to death.

A prop level of the virtual prop is higher than a prop level of a virtual prop in a non-target area.

S203. Add the virtual prop to a prop storage space corresponding to the first virtual character when a distance between the first virtual character and the virtual prop is less than a first distance.

In some embodiments, the virtual prop obtaining method may, but is not limited to, be applied to game applications, such as shooting game applications. In a game scene of the shooting game applications, during running of a shooting task, a player needs to obtain a virtual prop for enhancing the weapon strength of the first virtual character controlled by the player. Usually, the player may control the first virtual character to traverse the map to find virtual prop and complete picking up, so as to obtain the virtual prop. In addition, a target area for obtaining the virtual prop may be set in a map. The target area may be a designated area in the map, and the target area may alternatively be a plurality of designated areas in the map, which are not limited in the embodiments of this application. In the target area, a plurality of non-manipulative characters, that is, the second virtual characters, are preset. When needing to obtain a virtual prop, a player may go to the target area, and carry out a shooting battle with a second virtual character in the target area. The player may control the first virtual character to shoot the second virtual character, or control the first virtual character to wage some attack skills to the second virtual character, or the like, and the second virtual character may wage an attack against the first virtual character according to a preset program, so as to implement a man-machine battle, to obtain a shooting result of the shooting battle between the first virtual character and the second virtual character. The shooting result may be the result that the first virtual character shot the second virtual character to death, or the second virtual character shot the first virtual character to death. When the result is that the first virtual character shot the second virtual character to death, the second virtual character may be controlled to disappear or fall to the ground, and a virtual prop is displayed in an area matching a position of the second virtual character. The virtual prop is a randomly generated prop for strengthening the weapon, and there may be one or a plurality of virtual props displayed, which is not limited in the embodiments of this application. In some embodiments, the number of virtual props displayed can also be randomly generated. In addition, a prop level of the virtual prop is higher than a prop level of a virtual prop in a non-target area, so that the player can obtain a stronger weapon by killing the second virtual character in the target area. After displaying the virtual prop, the player may control the first virtual character to approach the virtual prop. When the distance between the first virtual character and the virtual prop is less than the first distance, the virtual prop may be added to the prop storage space corresponding to the first virtual character, so that the first virtual character can obtain and use the virtual prop from the prop storage space.

In this embodiment of this application, the first virtual character may be a character controlled by a player, and the second virtual character may be a non-manipulative character. The second virtual character may be specifically in the form of zombie, monster, or the like, which is not limited in this embodiment of this application. The target area is an area for obtaining a virtual prop by killing a second virtual character. In the target area, a plurality of second virtual characters may be preset, and in some embodiments, after a second virtual character is killed, a second virtual character may be generated at a random place in the target area, so as to ensure that there are a steady stream of second virtual characters in the target area for the first virtual characters controlled by the player to shoot. When the first virtual character and the second virtual character are performing a shooting battle, a shooting result of the shooting battle between the first virtual character and the second virtual character may be obtained. The shooting result may include, but is not limited to, a result that the first virtual character shot the second virtual character to death, a result that the second virtual character shot the first virtual character to death, or the like, which is not limited in this embodiment of this application. Further, when the shooting result is that the first virtual character shot the second virtual character to death, a virtual prop may be displayed in an area matching the position of the second virtual character, that is, in the vicinity of the second virtual character. The virtual prop can be a prop used to enhance the shooting weapon, including but not limited to guns, ammunition, and the like. Each virtual prop has a corresponding prop level. A higher prop level indicates a stronger performance of the virtual prop. The prop level of the virtual prop obtained by the player by shooting the second virtual character in the target area is higher than that randomly picked by the player in the non-target area, that is, the virtual prop obtained in this way is stronger. After displaying the virtual prop, the player may control the first virtual character to move to the position of the virtual prop, and after the first virtual character approaches the virtual prop, the virtual prop may be automatically picked up, that is, when the distance between the first virtual character and the virtual prop is less than the first distance, the virtual prop may be added to the prop storage space corresponding to the first virtual character. The prop storage space is a space for a virtual character to store props, and the props in the prop storage space can be used by the virtual character, so the virtual prop is added to the prop storage space corresponding to the first virtual character when the first virtual character picks up the virtual prop, so that the first virtual character can subsequently use the virtual prop. In some embodiments, there may be one or more prop storage spaces corresponding to the first virtual character, which is not limited in this embodiment of this application. When there are a plurality of prop storage spaces corresponding to the first virtual character, the virtual prop may be added to the prop storage space corresponding to the first virtual character and matched with the category of the virtual prop. For example, when the virtual prop is a gun, the virtual prop may be added to the first prop storage space corresponding to the first virtual character, and when the virtual prop is ammunition, the virtual prop may be added to the second prop storage space corresponding to the first virtual character.

In some embodiments, the obtaining a shooting result of a shooting battle between a first virtual character and a second virtual character may include:

S1. Obtain a distance between the first virtual character and the second virtual character.

S2. Determine that the shooting battle is performed between the first virtual character and the second virtual character and obtaining the shooting result of the shooting battle between the first virtual character and the second virtual character when the distance is less than a second distance or a shooting instruction triggered by the first virtual character to the second virtual character is detected.

In this embodiment of this application, it is determined that the shooting battle is performed between the first virtual character and the second virtual character and the shooting result of the shooting battle between the first virtual character and the second virtual character is obtained when the distance between the first virtual character and the second virtual character is less than a second distance or a shooting instruction triggered by the first virtual character to the second virtual character is detected. The second distance may be the same as or different from the first distance, which is not limited in this embodiment of this application.

By implementing the optional implementation, it may be determined that the shooting battle is performed between the first virtual character and the second virtual character when the distance between the first virtual character and the second virtual character is less than the second distance, or in case that a shooting instruction triggered by the first virtual character to the second virtual character is detected. When the shooting battle is performed between the first virtual character and the second virtual character, the second virtual character may attack the first virtual character according to a preset attack program, and the first virtual character may attack the second virtual character according to the control instruction triggered by a touch operation of the player, so as to obtain a shooting result. By the process, it may be determined that the shooting battle is performed between the first virtual character and the second virtual character when the first virtual character enters a detection range of the second virtual character, or when the first virtual character attacks the second virtual character, and the mode of entering the battle is determined to conform to a battle habit, thus improving the authenticity of determining the shooting battle.

In some embodiments, the obtaining a distance between the first virtual character and the second virtual character may include:

- obtaining the distance between the first virtual character and the second virtual character in a case of detecting that the first virtual character enters the target area, where the target area is a designated area on a map where the shooting task is run and the target area is used for obtaining the virtual prop.

In this embodiment of this application, during running of a shooting task, a virtual map may be displayed on a man-machine interaction interface, the virtual map is used for indicating a place where a player may control a virtual character to move, the target area is a designated area on the virtual map, and the player may obtain a virtual prop by entering the target area to shoot a second virtual character.

By implementing the implementation, the distance between the first virtual character and the second virtual character may be obtained when the first virtual character enters the target area. The target area is a designated area for obtaining a virtual prop on the map, and therefore the distance between the first virtual character and the second virtual character may be obtained when the first virtual character enters the target area, which is used as a basis for subsequently determining whether the first virtual character and the second virtual character enter a battle state, thereby improving the reliability of determining the battle state.

In some embodiments, after the displaying a virtual prop at an area matching a position of the second virtual character when the shooting result is that the first virtual character shot the second virtual character to death, the method may further include the following steps:

- starting a timer when the virtual prop is displayed; and
- the adding the virtual prop to a prop storage space corresponding to the first virtual character when a distance between the first virtual character and the virtual prop is less than a first distance may include:
- adding the virtual prop to the prop storage space corresponding to the first virtual character and stopping the timer when the distance between the first virtual character and the virtual prop is less than the first distance and the timer is less than a target time period.

In this embodiment of this application, the timer may be started when the virtual prop is displayed, and the virtual prop is added to the prop storage space corresponding to the first virtual character and timer is stopped only when the distance between the first virtual character and the virtual prop is less than the first distance and the timer is less than the target time period.

By implementing the implementation, the timer may be performed after the virtual prop is displayed. When the timer is not expired and the distance between the first virtual character and the virtual prop is less than the first distance, the virtual prop is added to the prop storage space corresponding to the first virtual character. The process may increase the timing display function of the virtual prop, and improve the timeliness of obtaining the virtual prop for the first virtual character.

In some embodiments, the method may further include the following steps:

controlling the virtual prop to disappear when the timer is greater than the target time period.

By implementing the implementation, the virtual prop can be controlled to disappear after the virtual prop is displayed for a period of time. After the virtual prop disappear, even if the first virtual character is close to the position of the virtual prop, the virtual prop cannot be picked up, thereby further improving the timeliness of obtaining the virtual prop for the first virtual character.

In some embodiments, after the displaying a virtual prop at an area matching an area of the second virtual character when the shooting result is that the first virtual character shot the second virtual character to death, the method may further include the following steps:

displaying attribute information of the virtual prop at an area matching a position of the virtual prop when the distance between the first virtual character and the virtual prop is less than a third distance; and the adding the virtual prop to a prop storage space corresponding to the first virtual character when a distance between the first virtual character and the virtual prop is less than a first distance includes:

adding the virtual prop to the prop storage space corresponding to the first virtual character when a confirmation instruction for the attribute information is received and the distance between the first virtual character and the virtual prop is less than the first distance.

In this embodiment of this application, the third distance may be the same as the first distance or different from the first distance. If the third distance is greater than the first distance, the attribute information of the virtual prop may be displayed first in the process in which the first virtual character moves to the virtual prop. If the player chooses not to pick up the virtual prop, the player may stop moving to the virtual prop. Alternatively, a selection button is provided on the displayed attribute information of the virtual prop and the player may cancel picking up the virtual prop by clicking to cancel the selection button. In this case, the player does not pick up the virtual prop even if the player continues to move to the virtual prop until the distance from the virtual prop is less than the first distance. In this case, when the player does not click the to cancel the selection button, it is determined that the confirmation instruction for the attribute information is received. In this case, the player continues to move to the virtual prop until the distance from the virtual prop is less than the first distance, and the virtual prop can be picked up.

By implementing this implementation, the attribute information of the virtual prop can be displayed when the distance between the first virtual character and the virtual prop is less than the third distance, so that the player may choose whether to pick up the virtual prop according to the attribute information. Further, when a confirmation instruction for the attribute information is received, the virtual prop is picked up when the distance between the first virtual character and the virtual prop is less than the first distance, and it can be understood that when a cancellation instruction for the attribute information is received, the virtual prop is not picked up even if the distance between the first virtual character and the virtual prop is less than the first distance. This process improves the freedom of picking up a virtual prop, and a player may choose whether to pick up a virtual prop according to needs, so that obtaining of a virtual prop is more flexible.

In some embodiments, after adding the virtual prop to the prop storage space corresponding to the first virtual character, the following steps may further be performed:

equipping the first virtual character in an equipping mode corresponding to the virtual prop when an equipping instruction for the virtual prop is detected.

In this embodiment of this application, if the virtual prop is a gun, the equipping mode corresponding to the virtual prop is to update the gun held by the first virtual character; if the virtual prop is ammunition, the equipping mode corresponding to the virtual prop is to load the ammunition into the gun held by the first virtual character.

By implementing the implementation, the first virtual character may be equipped according to an equipping instruction after the virtual prop is added to the prop storage space corresponding to the first virtual character, thereby implementing the use of the virtual prop.

Figure 3:
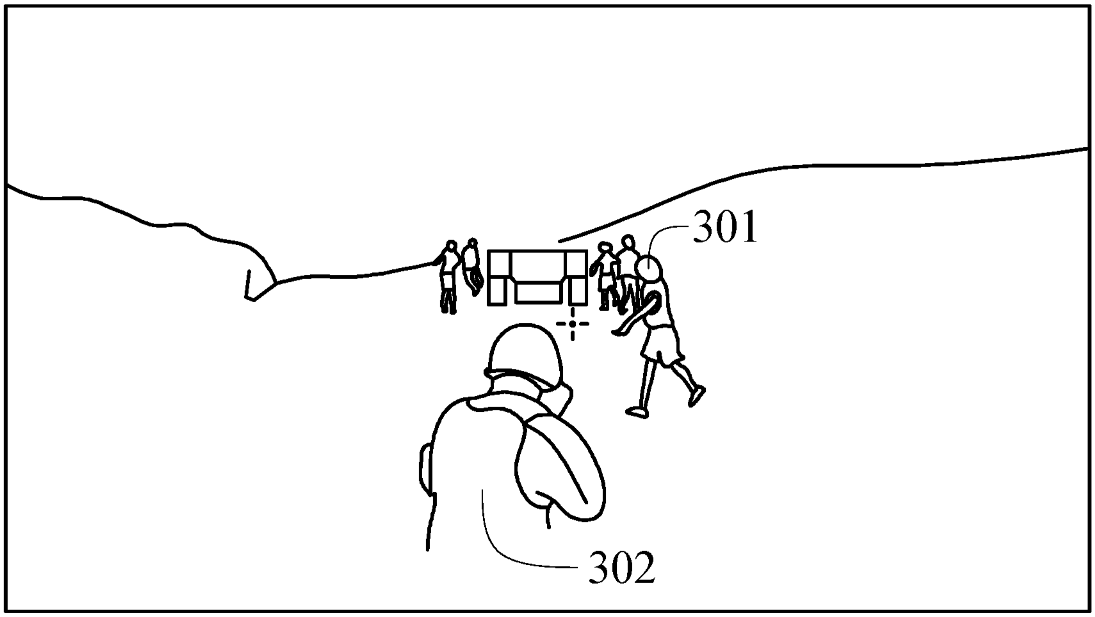
FIG. 3 is a schematic diagram of an exemplary target area according to an embodiment of this application.
Figure 4:
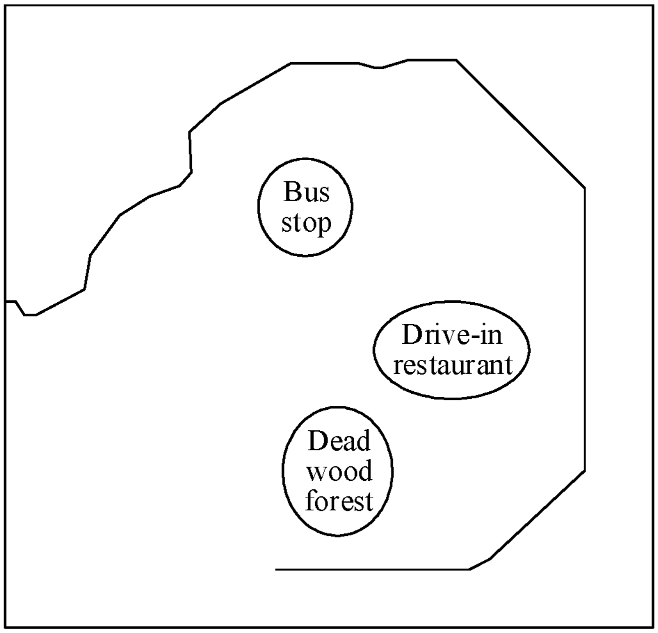
FIG. 4 is a schematic diagram of another exemplary target area according to an embodiment of this application.

Referring to FIG. 3, FIG. 3 is a schematic diagram of an exemplary target area. As shown in FIG. 3, a first virtual character 302 enters the target area, and there are several second virtual characters 301 in the target area. In FIG. 3, the second virtual characters 301 each may be in zombie form. In addition, the target area may be set as a relatively wide and flat area in which the second virtual characters 301 are more easily observed by a player, thereby facilitating the player to control the first virtual character 302 to shoot the second virtual characters 301. The player may control the first virtual character 302 to perform shooting to attack a second virtual character 301. When the first virtual character 302 shot the second virtual character 301 to death, a virtual prop may appear for the player to pick up. In some embodiments, a moving speed of the first virtual character 302 faster than that of the second virtual characters 301, thereby reducing the difficulty for the first virtual character 302 to shoot the second virtual characters 301 and further reducing the operational complexity. Further, Referring to FIG. 4, FIG. 4 is a schematic diagram of another optional target area. As shown in FIG. 4, in a map on which a shooting task is run, three places are preset as the target areas, that is, a bus stop, a drive-in restaurant, and a dead wood forest shown in FIG. 4. The second virtual characters may be preset in the three places, and the player may control the first virtual character to go to the three places to perform a shooting battle with the second virtual characters.

Figure 5:
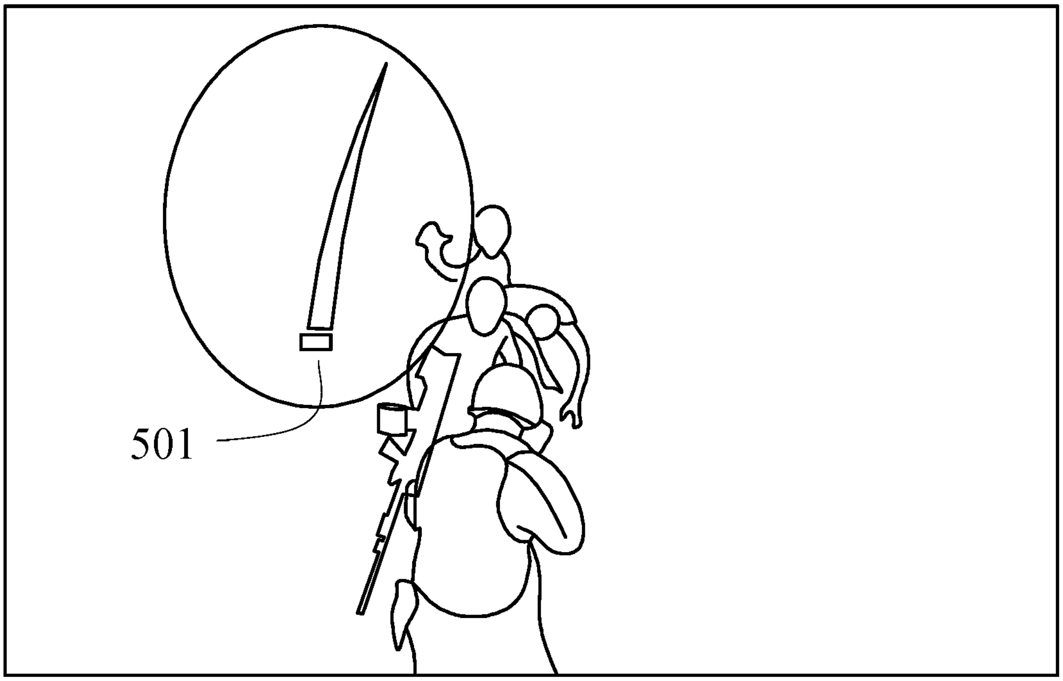
FIG. 5 is a schematic diagram of an exemplary virtual prop according to an embodiment of this application.
Figure 6:
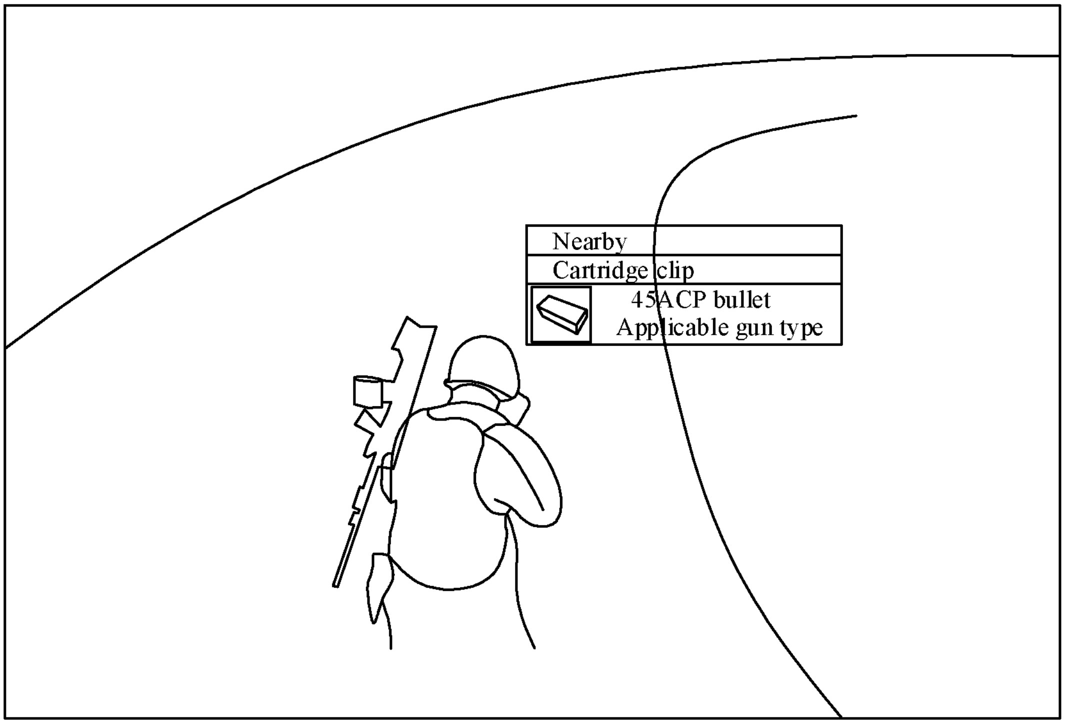
FIG. 6 is a schematic diagram illustrating attribute information of an exemplary virtual prop according to an embodiment of this application.

Referring to FIG. 5, FIG. 5 is a schematic diagram of an exemplary virtual prop. As shown in FIG. 5, when the first virtual character shot the second virtual character to death, the virtual prop may be displayed in an area matching a position of the second virtual character. In some embodiments, as shown in FIG. 5, after the second virtual character was shot to death, the second virtual character may be controlled to disappear and a virtual prop 501 is displayed in an area matching the position of the second virtual character. In some embodiments, a special effect display mode may be adopted when displaying the virtual prop 501. As shown in FIG. 5, during displaying of the virtual prop 501, a light beam is displayed in the vicinity of the virtual prop 501. In some embodiments, the special effect may not be used when the virtual prop 501 is displayed, or other special effects may be used when the virtual prop 501 is displayed, which is not limited in this embodiment of this application. Referring to FIG. 6, FIG. 6 is a schematic diagram illustrating attribute information of an exemplary virtual prop. As shown in FIG. 6, the virtual prop is a cartridge clip, and the attribute information of the virtual cartridge clip may show an applicable bullet type, that is, applicable to a 45ACP bullet, and may further show an applicable gun type, such as a pistol. A player may determine whether to pick up the virtual prop according to the attribute information of the virtual prop, so as to meet various needs of players.

Figure 7:
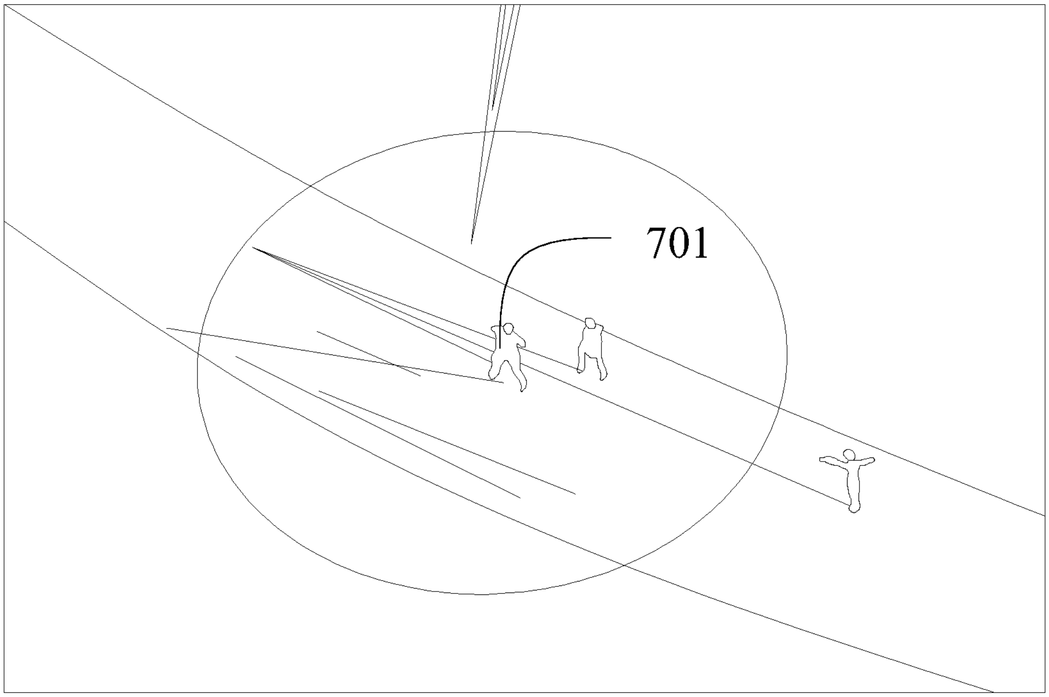
FIG. 7 is a schematic diagram of a sensing range of an exemplary second virtual character according to an embodiment of this application.
Figure 8:
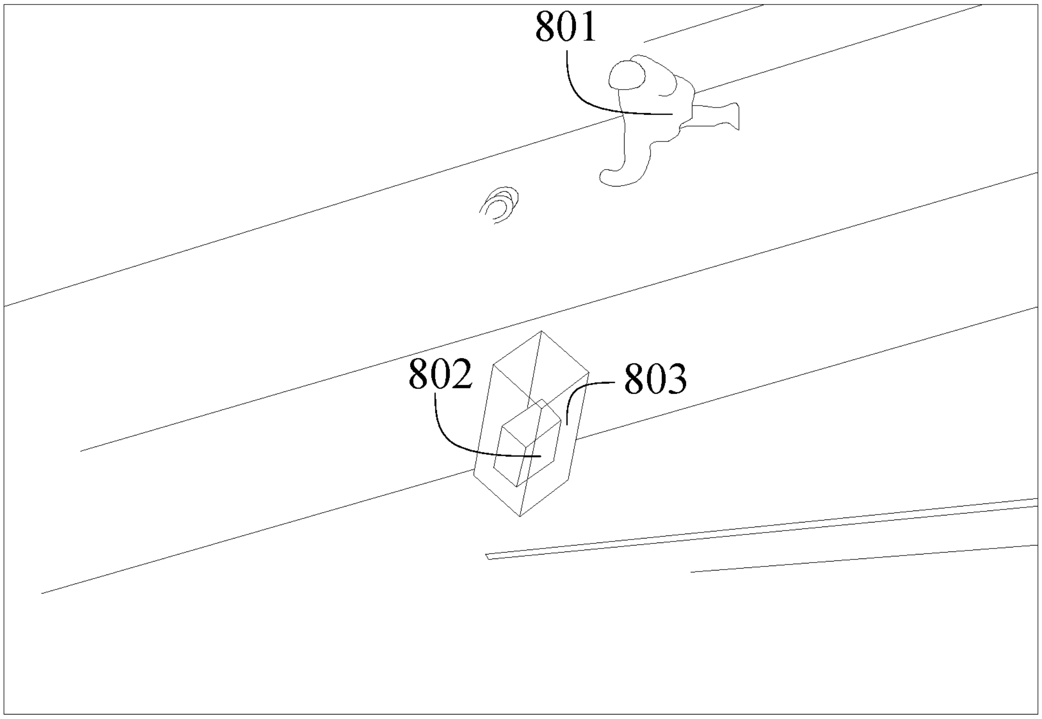
FIG. 8 is a schematic diagram illustrating obtaining of a virtual prop according to an embodiment of this application.

Referring to FIG. 7, FIG. 7 is a schematic diagram of a sensing range of the second virtual character. As shown in FIG. 7, a circular area in FIG. 7 is the sensing range of the second virtual character 701. Further, the sensing range is a circular area with the second virtual character 701 as the center and a preset distance as the radius. Different second virtual characters have different positions and correspond to different sensing ranges. When the first virtual character enters the sensing range, the second virtual character may automatically wage an attack against the first virtual character. When the first virtual character does not enter the sensing range but the first virtual character wages an attack against the second virtual character, the second virtual character may also automatically wage an attack against the first virtual character. When the first virtual character does not enter the sensing range and does not wage an attack against the second virtual character, the second virtual character may not wage an attack against the first virtual character. Referring to FIG. 8, FIG. 8 is a schematic diagram for obtaining a virtual prop. A collision detection box 803 is disposed around a virtual prop 802, and a collision detection box is further disposed around a first virtual character 801. When the collision detection box of the first virtual character 801 and the collision detection box 803 come into contact, the first virtual character 801 may be controlled to automatically pick up the virtual prop 802.

Figure 9:
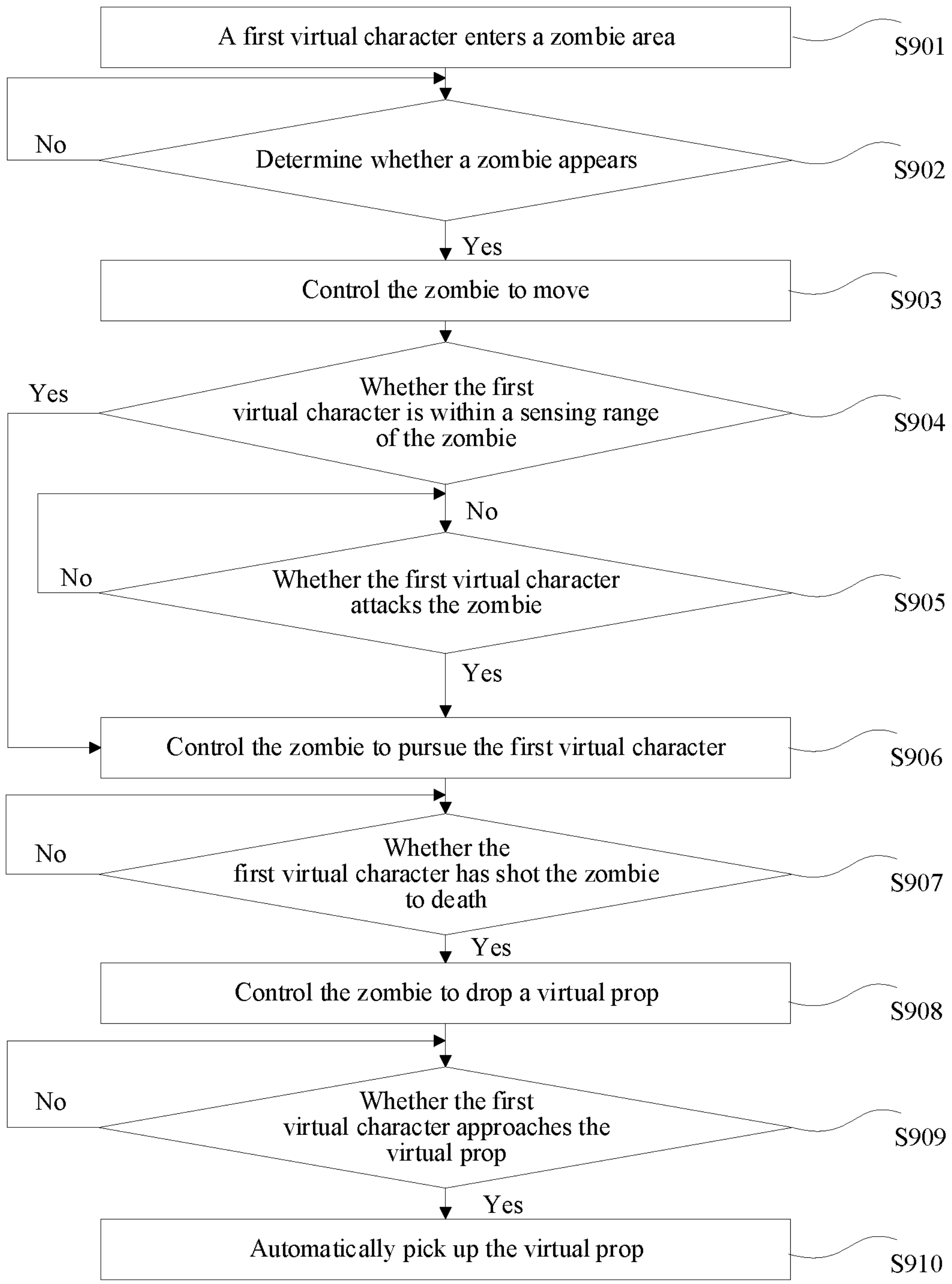
FIG. 9 is an exemplary schematic flowchart of obtaining a virtual prop according to an embodiment of this application.

Referring to FIG. 9, FIG. 9 is a schematic flowchart of obtaining a virtual prop. As shown in FIG. 9, the following steps may be performed:

S901. A first virtual character enters a zombie area.

S902. Determine whether a zombie appears, when a zombie appears, perform step S903, and when no zombie appears, continuously perform step S902.

S903. Control the zombie to move.

S904. Determine whether the first virtual character is within a sensing range of the zombie, when the first virtual character is within the sensing range of the zombie, perform step S906, and when the first virtual character is not within the sensing range of the zombie, perform step S905.

S905. Determine whether the first virtual character attacks the zombie, when the first virtual character attacks the zombie, perform step S906, and when the first virtual character does not attack the zombie, continuously perform step S905.

S906. Control the zombie to pursue the first virtual character.

S907. Determine whether the first virtual character has shot the zombie to death, when the first virtual character has shot the zombie to death, perform step S908, and when the first virtual character has not shot the zombie to death, continuously perform step S907.

S908. Control the zombie to drop a virtual prop.

S909. Determine whether the first virtual character approaches the virtual prop, when the first virtual character approaches the virtual prop, perform step S910, and when the first virtual character does not approach the virtual prop, continuously perform step S909.

S910. Automatically pick up the virtual prop.

In this embodiment of this application, the second virtual characters each may be in a zombie form, the zombie area is the target area, and there are a large number of second virtual characters in the target area, that is, there are a large number of zombies in the zombie area. After the first virtual character enters the zombie area, because the zombies in the zombie area are moving randomly, when a zombie moves into the field of vision of the first virtual character, the zombie may be controlled to continue moving. In some embodiments, the zombie may be controlled to move towards the first virtual character. When the first virtual character is within a sensing range of the zombie, the zombie may lock the first virtual character to attack. When the first virtual character is not within the sensing range of the zombie but the first virtual character attacks the zombie, the zombie may also lock the first virtual character to attack. When the first virtual character shot the zombie to death, the zombie may be controlled to drop a virtual prop. When the first virtual character approaches the virtual prop, the virtual prop may be automatically picked up, that is, the virtual prop is added to the prop storage space corresponding to the first virtual character.

In some embodiments, the game application may be a multiplayer online battle arena (MOBA) application or may alternatively be a single-player game (SPG) application. The type of the game applications may include, but is not limited to, at least one of the following: two-dimension (2D) game applications, three-dimension (3D) game applications, virtual reality (VR) game applications, augmented reality (AR) game applications, and mixed reality (MR) game applications. The above is only an example and is not limited in this embodiment.

In addition, the shooting game application may be a third person shooting game (TPS) application, for example, the shooting game application is run from the perspective of a third party character object other than a virtual character controlled by the current player, and the game application may alternatively be a first person shooting game (FPS) application, for example, the shooting game application is run from the perspective of a virtual character controlled by the current player. Correspondingly, an audio source virtual object that generates a sound during running of a game task may, but is not limited to: virtual characters (also referred to as player characters) or non-player characters (NPC) controlled by players through various game application clients, props objects (such as guns) controlled by the virtual characters, or vehicle objects (such as vehicles) controlled by the virtual characters. The above is only an example and is not limited in this embodiment.

For simplicity of description, the foregoing method embodiments are all expressed as a combination of a series of actions, but a person skilled in the art needs to appreciate that because some steps may be performed in other sequences or simultaneously according to this application, this application is not limited by the sequence of actions described. Secondly, a person skilled in the art needs to appreciate that the embodiments described in the specification are preferred embodiments and the actions and modules involved are not necessarily essential for this application.

FIG. 1, FIG. 2, and FIG. 9 are schematic flowcharts of a virtual prop obtaining method according to an embodiment. It is to be understood that although the steps in the flowcharts of FIG. 1, FIG. 2, and FIG. 9 are shown in sequence as indicated by the arrows, these steps are not necessarily performed in sequence as indicated by the arrows. Unless explicitly stated in this text, there are no strict sequential restrictions on the execution of these steps, and these steps can be performed in other sequences. In addition, at least a part of the steps in FIG. 1, FIG. 2, and FIG. 9 may include a plurality of sub-steps or a plurality of stages, these sub-steps or stages are not necessarily executed at the same time, but may be executed at different times, and the execution sequence of these sub-steps or stages is not necessarily sequential, but may be executed in turn or alternately with other steps or at least a part of sub-steps or stages of other steps.

Figure 10:
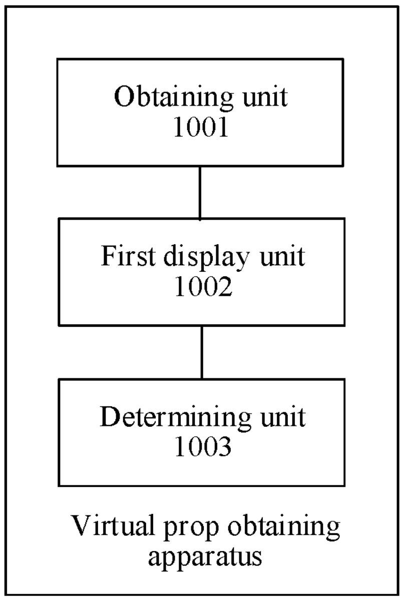
FIG. 10 is a schematic structural diagram of an exemplary virtual prop obtaining apparatus according to an embodiment of this application.

Another aspect of the embodiments of this application provides a virtual prop obtaining apparatus for implementing the virtual prop obtaining method. As shown in FIG. 10, the apparatus includes:

- an obtaining unit 1001, configured to obtain a shooting result of a shooting battle between a first virtual character and a second virtual character during running of a shooting task, the first virtual character being controlled by a user of the electronic device and the second virtual character being a non-manipulative character in a target area of the shooting battle;
- a first display unit 1002, configured to display a virtual prop at an area matching a position of the second virtual character when the shooting result is that the first virtual character shot the second virtual character to death, a prop level of the virtual prop being higher than a prop level of a virtual prop in a non-target area; and
- a determining unit 1003, configured to add the virtual prop to a prop storage space corresponding to the first virtual character when a distance between the first virtual character and the virtual prop is less than a first distance.

In this embodiment of this application, a shooting result of a shooting battle between a first virtual character and a second virtual character is obtained during running of a shooting task, the first virtual character being controlled by a user of the electronic device and the second virtual character being a non-manipulative character in a target area of the shooting battle; a virtual prop is displayed at an area matching a position of the second virtual character when the shooting result is that the first virtual character shot the second virtual character to death, a prop level of the virtual prop being higher than a prop level of a virtual prop in the non-target area; and the virtual prop is added to a prop storage space corresponding to the first virtual character when a distance between the first virtual character and the virtual prop is less than a first distance. In this process, the virtual prop can be obtained by shooting the second virtual character in the target area, and the virtual prop can be obtained only by shooting the second virtual character in the determined target area without traversing the map to find a randomly generated virtual prop, thereby reducing the operation complexity of obtaining a virtual prop.

In some embodiments, the obtaining unit being configured to obtain a shooting result of a shooting battle between a first virtual character and a second virtual character further includes:

- the obtaining unit being configured to obtain a distance between the first virtual character and the second virtual character; determine that the shooting battle is performed between the first virtual character and the second virtual character and obtain the shooting result of the shooting battle between the first virtual character and the second virtual character when the distance is less than a second distance or a shooting instruction triggered by the first virtual character to the second virtual character is detected.

In some embodiments, the obtaining unit being configured to obtain a distance between the first virtual character and the second virtual character further includes:

- the obtaining unit being configured to obtain the distance between the first virtual character and the second virtual character in a case of detecting that the first virtual character enters the target area, where the target area is a designated area on a map where the shooting task is run and the target area is used for obtaining the virtual prop.

In some embodiments, the apparatus may further include:

- a timing unit, configured to, after a virtual prop is displayed at an area matching a position of the second virtual character when the shooting result is that the first virtual character shot the second virtual character to death, start a timer when the virtual prop is displayed; and
- the determining unit being configured to add the virtual prop to a prop storage space corresponding to the first virtual character when a distance between the first virtual character and the virtual prop is less than a first distance further includes:
- the determining unit being configured to add the virtual prop to the prop storage space corresponding to the first virtual character and stop the timing when the distance between the first virtual character and the virtual prop is less than the first distance and the timer is less than a target time period.

In some embodiments, the apparatus may further include:

- a control unit, configured to control the virtual prop to disappear when the timer is greater than the target time period.

In some embodiments, the apparatus may further include: a second display unit, configured to, after a virtual prop is displayed at an area matching a position of the second virtual character when the shooting result is that the first virtual character shot the second virtual character to death, display attribute information of the virtual prop at an area matching a position of the virtual prop when the distance between the first virtual character and the virtual prop is less than a third distance; and

- the determining unit being configured to add the virtual prop to a prop storage space corresponding to the first virtual character when a distance between the first virtual character and the virtual prop is less than a first distance further includes:
- the determining unit being configured to add the virtual prop to the prop storage space corresponding to the first virtual character when a confirmation instruction for the attribute information is received and the distance between the first virtual character and the virtual prop is less than the first distance.

In some embodiments, the apparatus further includes: an equipping unit, configured to, after the virtual prop is added to the prop storage space corresponding to the first virtual character, equip the first virtual character in an equipping mode corresponding to the virtual prop when an equipping instruction for the virtual prop is detected.

Figure 11:
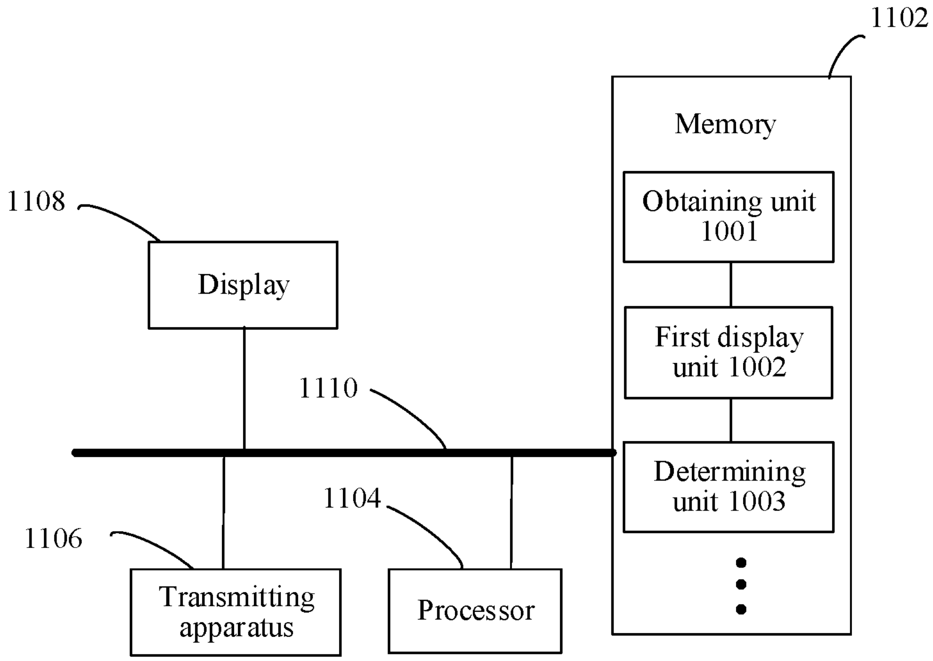
FIG. 11 is a schematic structural diagram of an exemplary electronic device according to an embodiment of this application.

Another aspect of the embodiments of this application further provides an electronic device for implementing the operation control method. As shown in FIG. 11, the electronic device includes a memory 1102 and a processor 1104. The memory 1102 stores computer programs, and the processor 1104 is configured to perform the steps of any one of the method embodiments through the computer programs.

In some embodiments, the electronic device may be at least one of a plurality of network devices located in a computer network such as at least one of user equipment and a server in FIG. 1.

In some embodiments, the processor may be configured to perform the following steps through the computer programs:

S1. Obtain a shooting result of a shooting battle between a first virtual character and a second virtual character during running of a shooting task, the first virtual character being controlled by a user of the electronic device and the second virtual character being a non-manipulative character in a target area of the shooting battle.

S2. Display a virtual prop at an area matching a position of the second virtual character when the shooting result is that the first virtual character shot the second virtual character to death, a prop level of the virtual prop being higher than a prop level of a virtual prop in a non-target area.

S3. Add the virtual prop to a prop storage space corresponding to the first virtual character when a distance between the first virtual character and the virtual prop is less than a first distance.

In some embodiments, as it is to be understood by a person skilled in the art, the structure shown in FIG. 11 is only schematic, and the electronic device may alternatively be a terminal device such as a smart phone (for example, an Android phone or an iOS phone), a tablet computer, a palmtop computer, a mobile Internet device (MID), or a PAD. FIG. 11 does not limit the structure of the electronic device. For example, the electronic device may alternatively include more or fewer components (for example, a network interface) as compared with the components shown in FIG. 11 or have a different configuration as compared with the components shown in FIG. 11.

The memory 1102 may be configured to store software programs and modules, such as program instructions/modules corresponding to the virtual prop obtaining method and apparatus in this embodiment of this application. The processor 1104 runs the software programs and modules stored in the memory 1102 to execute various functional applications and data processing, that is, implementing the operation control method. The memory 1102 may include a high-speed random access memory (RAM) or may alternatively include a non-volatile memory such as one or more magnetic storage apparatuses, a flash memory, or other non-volatile solid-state memories. In some examples, the memory 1102 may further include a memory remotely provided with respect to processor 1104, and the remote memories may be connected to the terminal via a network. Examples of the network include, but are not limited to, the Internet, an intranet, a local area network, a mobile communication network, and a combination thereof. The memory 1102 may further be, but is not limited to, configured to store information such as operation instructions, state information of a first state (for example, a first energy value), and state information of a second state (for example, a second energy value). As an example, as shown in FIG. 11, the memory 1102 may include, but is not limited to, an obtaining unit 1001, a first display unit 1002, and a determining unit 1003 in the operation control apparatus. In addition, other module units in the virtual prop obtaining apparatus may further be included but are not limited thereto, which are not repeated in this example.

In some embodiments, a transmitting apparatus 1106 is configured to receive or transmit data via a network. Specific examples of the network may include a wired network and a wireless network. In an example, the transmitting apparatus 1106 includes a network adapter (NIC) that can be connected to other network devices and routers via a network cable to communicate with the Internet or a local area network. In an example, the transmitting apparatus 1106 is a radio frequency (RF) module, which configured to communicated with the Internet in a wireless manner.

In addition, the electronic device further includes: a display 1108, configured to display a virtual prop; and a connection bus 1110, configured to connect the module components in the electronic device.

According to still another aspect of the embodiments of this application, a storage medium is further provided. The storage medium stores a computer program, the computer program being set to perform steps in any one of the foregoing method embodiments when run.

In some embodiments, the storage medium may be configured to store computer programs for performing the following steps:

S1. Obtain a shooting result of a shooting battle between a first virtual character and a second virtual character during running of a shooting task, the first virtual character being controlled by a user of the electronic device and the second virtual character being a non-manipulative character in a target area of the shooting battle.

S2. Display a virtual prop at an area matching a position of the second virtual character when the shooting result is that the first virtual character shot the second virtual character to death, a prop level of the virtual prop being higher than a prop level of a virtual prop in a non-target area.

S3. Add the virtual prop to a prop storage space corresponding to the first virtual character when a distance between the first virtual character and the virtual prop is less than a first distance.

In some embodiments, a person of ordinary skill in the art may understand that all or some of procedures of the methods in the foregoing embodiments may be implemented by a computer program instructing relevant hardware. The program may be stored in a non-volatile computer-readable storage medium. When the program is executed, the procedures of the foregoing method embodiments may be included. Any reference to a memory, a storage, a database, or another medium used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), a flash memory, or the like. The volatile memory may include a RAM or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDR-SDRAM), an enhanced SDRAM (ESDRAM), a Synchlink DRAM (SLDRAM), a Rambus direct RAM (RDRAM), a direct Rambus dynamic RAM (DRDRAM), and a Rambus dynamic RAM (RDRAM).

The sequence numbers of the foregoing embodiments of this application are merely for description purposes, and are not intended to indicate the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this application essentially, or the part contributing to the related art, or the entire or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the embodiments of this application.

In the foregoing embodiments of this application, the descriptions of the embodiments have their respective focuses. For a part that is not described in detail in an embodiment, refer to related descriptions in other embodiments.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. In the several embodiments provided in this application, it is to be understood that, the disclosed client may be implemented in another manner. The described apparatus embodiment is merely exemplary. For example, the unit division is merely logical function division and may be other division during actual implementation. For example, a plurality of units or components may be combined or integrated into another system, or some features may be ignored or not performed. In addition, the coupling, or direct coupling, or communication connection between the displayed or discussed components may be the indirect coupling or communication connection by means of some interfaces, units, or modules, and may be electrical or of other forms.

The units described as separate components may or may not be physically separate, and components displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

The foregoing descriptions are merely exemplary implementations of this application. A person of ordinary skill in the art may make some improvements and polishing without departing from the principle of this application and the improvements and polishing shall fall within the protection scope of this application.

What is claimed is:

1. A virtual prop obtaining method performed by an electronic device, the method comprising:

displaying, by the electronic device, a virtual map on a man-machine interaction interface of the electronic device, the virtual map including a predetermined target area having a plurality of non-manipulative characters including a second virtual character not appearing in the predetermined target area initially;

controlling, by the electronic device, a first virtual character to enter the predetermined target area in the virtual map when a virtual prop obtaining instruction is detected;

in response to the first virtual character entering the predetermined target area, causing, by the electronic device, an appearance of the second virtual character in the predetermined target area and controlling movement of the first virtual character and the second virtual character in the predetermined target area; and determining, by the electronic device, whether the first virtual character enters a sensing range of the second virtual character in the predetermined target area, the first virtual character being controlled by a user of the electronic device, wherein the sensing range is a circular area having a second distance as a radius of the circular area and with the second virtual character located at a center of the circular area and the second virtual character is configured to automatically wage an attack against the first virtual character;

in response to a determination that the first virtual character enters the sensing range of the second virtual character, causing, by the electronic device, the second virtual character to automatically wage an attack against the first virtual character;

causing, by the electronic device, the first virtual character to move at a speed higher than that of the second virtual character to increase a chance of the first virtual character killing the second virtual character; and obtaining, by the electronic device, a shooting result of a shooting battle between the first virtual character and the second virtual character;

when the shooting result is that the first virtual character shot the second virtual character to death using a weapon associated with the first virtual character:

causing, by the electronic device, the second virtual character to drop a virtual prop; and displaying, by the electronic device, the virtual prop at an area matching a position of the second virtual character in the predetermined target area and a transient special effect in a vicinity of the virtual prop;

displaying, by the electronic device, attribute information of the virtual prop at an area matching a position of the virtual prop when a distance between the first virtual character and the virtual prop is less than a third distance and the third distance is less than the second distance;

causing, by the electronic device, the first virtual character to move towards the virtual prop in response to a confirmation instruction for the attribute information by the user of the electronic device, the confirmation instruction indicating that the virtual prop matches the weapon associated with the first virtual character and used for shooting the second virtual character to death;

adding, by the electronic device, the virtual prop to a prop storage space corresponding to the first virtual character when the distance between the first virtual character and the virtual prop is less than a first distance and the first distance is less than the third distance, further comprising:

disposing, by the electronic device, a first collision box around the first virtual character and a second collision box around the virtual prop, respectively, in the virtual map; and causing, by the electronic device, the first virtual character to pick up the virtual prop when the first collision box comes into contact with the second collision box in the virtual map; and loading, by the electronic device, the virtual prop into the weapon associated with the first virtual character in response to detecting an instruction for enhancing the weapon with the virtual prop by the user of the electronic device.

2. The method according to claim 1, wherein the obtaining, by the electronic device, a shooting result of a shooting battle between the first virtual character and the second virtual character comprises:

obtaining, by the electronic device, a distance between the first virtual character and the second virtual character; and determining, by the electronic device, that the shooting battle is performed between the first virtual character and the second virtual character and obtaining the shooting result of the shooting battle between the first virtual character and the second virtual character when the distance is less than a second distance or a shooting instruction triggered by the first virtual character to the second virtual character is detected.

3. The method according to claim 2, wherein the obtaining, by the electronic device, a distance between the first virtual character and the second virtual character comprises:

obtaining, by the electronic device, the distance between the first virtual character and the second virtual character in a case of detecting that the first virtual character enters the target area, the target area being a designated area on a map where the shooting task is run and the target area being used for obtaining the virtual prop.

4. The method according to claim 1, further comprising: after displaying the virtual prop:

starting, by the electronic device, a timer when the virtual prop is displayed; and adding, by the electronic device, the virtual prop to the prop storage space corresponding to the first virtual character and stopping the timer when the distance between the first virtual character and the virtual prop is less than the first distance and the timer is less than a target time period; and controlling, by the electronic device, the virtual prop to disappear when the timer is greater than the target time period.

5. The method according to claim 1, wherein the virtual map further comprises a non-target area; and a prop level of the virtual prop displayed after the second virtual character is shot to death is higher than a prop level of a virtual prop in the non-target area.

6. The method according to claim 1, further comprising:

regenerating, by the electronic device, another virtual character at a random location in the target area after the second virtual character is killed by the first virtual character.

7. An electronic device, comprising: a memory and a processor, the memory storing computer programs that, when executed by the processor, cause the electronic device to perform a plurality of operations including:

displaying, by the electronic device, a virtual map on a man-machine interaction interface of the electronic device, the virtual map including a predetermined target area having a plurality of non-manipulative characters including a second virtual character not appearing in the predetermined target area initially;

controlling, by the electronic device, a first virtual character to enter the predetermined target area in the virtual map when a virtual prop obtaining instruction is detected;

in response to the first virtual character entering the predetermined target area, causing, by the electronic device, an appearance of the second virtual character in the predetermined target area and controlling movement of the first virtual character and the second virtual character in the predetermined target area; and determining, by the electronic device, whether the first virtual character enters a sensing range of the second virtual character in the predetermined target area, the first virtual character being controlled by a user of the electronic device, wherein the sensing range is a circular area having a second distance as a radius of the circular area and with the second virtual character located at a center of the circular area and the second virtual character is configured to automatically wage an attack against the first virtual character;

in response to a determination that the first virtual character enters the sensing range of the second virtual character, causing, by the electronic device, the second virtual character to automatically wage an attack against the first virtual character; and causing, by the electronic device, the first virtual character to move at a speed higher than that of the second virtual character to increase a chance of the first virtual character killing the second virtual character; and obtaining, by the electronic device, a shooting result of a shooting battle between the first virtual character and the second virtual character;

when the shooting result is that the first virtual character shot the second virtual character to death using a weapon associated with the first virtual character:

causing, by the electronic device, the second virtual character to drop a virtual prop; and displaying, by the electronic device, the virtual prop at an area matching a position of the second virtual character in the predetermined target area and a transient special effect in a vicinity of the virtual prop;

displaying, by the electronic device, attribute information of the virtual prop at an area matching a position of the virtual prop when a distance between the first virtual character and the virtual prop is less than a third distance and the third distance is less than the second distance;

causing, by the electronic device, the first virtual character to move towards the virtual prop in response to a confirmation instruction for the attribute information by the user of the electronic device, the confirmation instruction indicating that the virtual prop matches the weapon associated with the first virtual character and used for shooting the second virtual character to death;

adding, by the electronic device, the virtual prop to a prop storage space corresponding to the first virtual character when the distance between the first virtual character and the virtual prop is less than a first distance and the first distance is less than the third distance, further comprising:

disposing, by the electronic device, a first collision box around the first virtual character and a second collision box around the virtual prop, respectively, in the virtual map; and causing, by the electronic device, the first virtual character to pick up the virtual prop when the first collision box comes into contact with the second collision box in the virtual map; and loading, by the electronic device, the virtual prop into the weapon associated with the first virtual character in response to detecting an instruction for enhancing the weapon with the virtual prop by the user of the electronic device.

8. The electronic device according to claim 7, wherein the obtaining a shooting result of a shooting battle between the first virtual character and the second virtual character comprises:

obtaining a distance between the first virtual character and the second virtual character; and determining that the shooting battle is performed between the first virtual character and the second virtual character and obtaining the shooting result of the shooting battle between the first virtual character and the second virtual character when the distance is less than a second distance or a shooting instruction triggered by the first virtual character to the second virtual character is detected.

9. The electronic device according to claim 8, wherein the obtaining a distance between the first virtual character and the second virtual character comprises:

obtaining the distance between the first virtual character and the second virtual character in a case of detecting that the first virtual character enters the target area, the target area being a designated area on a map where the shooting task is run and the target area being used for obtaining the virtual prop.

10. The electronic device according to claim 7, wherein the plurality of operations further comprise:

after displaying the virtual prop:

starting a timer when the virtual prop is displayed; and adding the virtual prop to the prop storage space corresponding to the first virtual character and stopping the timer when the distance between the first virtual character and the virtual prop is less than the first distance and the timer is less than a target time period; and controlling the virtual prop to disappear when the timer is greater than the target time period.

11. The electronic device according to claim 7, wherein the virtual map further comprises a non-target area; and a prop level of the virtual prop displayed after the second virtual character is shot to death is higher than a prop level of a virtual prop in the non-target area.

12. The electronic device according to claim 7, wherein the plurality of operations further comprise:

regenerating a second virtual character at a random location in the target area after the second virtual character is killed by the first virtual character.

13. A non-transitory computer-readable storage medium, storing computer programs, and the computer programs, when being executed by a processor of an electronic device, causing the electronic device to perform a plurality of operations including:

displaying, by the electronic device, a virtual map on a man-machine interaction interface of the electronic device, the virtual map including a predetermined target area having a plurality of non-manipulative characters including a second virtual character not appearing in the predetermined target area initially;

controlling, by the electronic device, a first virtual character to enter the predetermined target area in the virtual map when a virtual prop obtaining instruction is detected;

in response to the first virtual character entering the predetermined target area, causing, by the electronic device, an appearance of the second virtual character in the predetermined target area and controlling movement of the first virtual character and the second virtual character in the predetermined target area; and determining, by the electronic device, whether the first virtual character enters a sensing range of the second virtual character in the predetermined target area, the first virtual character being controlled by a user of the electronic device, wherein the sensing range is a circular area having a second distance as a radius of the circular area and with the second virtual character located at a center of the circular area and the second virtual character is configured to automatically wage an attack against the first virtual character;

in response to a determination that the first virtual character enters the sensing range of the second virtual character, causing, by the electronic device, the second virtual character to automatically wage an attack against the first virtual character; and causing, by the electronic device, the first virtual character to move at a speed higher than that of the second virtual character to increase a chance of the first virtual character killing the second virtual character; and obtaining, by the electronic device, a shooting result of a shooting battle between the first virtual character and the second virtual character;

when the shooting result is that the first virtual character shot the second virtual character to death using a weapon associated with the first virtual character:

causing, by the electronic device, the second virtual character to drop a virtual prop; and displaying, by the electronic device, the virtual prop at an area matching a position of the second virtual character in the predetermined target area and a transient special effect in a vicinity of the virtual prop;

displaying, by the electronic device, attribute information of the virtual prop at an area matching a position of the virtual prop when a distance between the first virtual character and the virtual prop is less than a third distance and the third distance is less than the second distance;

causing, by the electronic device, the first virtual character to move towards the virtual prop in response to a confirmation instruction for the attribute information by the user of the electronic device, the confirmation instruction indicating that the virtual prop matches the weapon associated with the first virtual character and used for shooting the second virtual character to death;

adding, by the electronic device, the virtual prop to a prop storage space corresponding to the first virtual character when the distance between the first virtual character and the virtual prop is less than a first distance and the first distance is less than the third distance, further comprising:

disposing, by the electronic device, a first collision box around the first virtual character and a second collision box around the virtual prop, respectively, in the virtual map; and causing, by the electronic device, the first virtual character to pick up the virtual prop when the first collision box comes into contact with the second collision box in the virtual map; and loading, by the electronic device, the virtual prop into the weapon associated with the first virtual character in response to detecting an instruction for enhancing the weapon with the virtual prop by the user of the electronic device.

14. The non-transitory computer-readable storage medium according to claim 13, wherein the obtaining a shooting result of a shooting battle between the first virtual character and the second virtual character comprises:

obtaining a distance between the first virtual character and the second virtual character; and determining that the shooting battle is performed between the first virtual character and the second virtual character and obtaining the shooting result of the shooting battle between the first virtual character and the second virtual character when the distance is less than a second distance or a shooting instruction triggered by the first virtual character to the second virtual character is detected.

15. The non-transitory computer-readable storage medium according to claim 13, wherein the plurality of operations further comprise:

after displaying the virtual prop:

starting a timer when the virtual prop is displayed; and adding the virtual prop to the prop storage space corresponding to the first virtual character and stopping the timer when the distance between the first virtual character and the virtual prop is less than the first distance and the timer is less than a target time period; and controlling the virtual prop to disappear when the timer is greater than the target time period.

16. The non-transitory computer-readable storage medium according to claim 13, wherein the virtual map further comprises a non-target area; and a prop level of the virtual prop displayed after the second virtual character is shot to death is higher than a prop level of a virtual prop in the non-target area.

17. The non-transitory computer-readable storage medium according to claim 13, wherein the plurality of operations further comprise:

regenerating another virtual character at a random location in the target area after the second virtual character is killed by the first virtual character.

* * * * *